United States Patent
De Boer

(10) Patent No.: US 8,113,792 B2
(45) Date of Patent: Feb. 14, 2012

(54) COMPRESSOR UNIT WITH PRESSURE COMPENSATOR

(75) Inventor: Geert De Boer, Dalen (NL)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/920,507

(22) PCT Filed: Feb. 19, 2009

(86) PCT No.: PCT/EP2009/051960
§ 371 (c)(1),
(2), (4) Date: Sep. 1, 2010

(87) PCT Pub. No.: WO2009/115389
PCT Pub. Date: Sep. 24, 2009

(65) Prior Publication Data
US 2011/0008184 A1    Jan. 13, 2011

(30) Foreign Application Priority Data
Mar. 19, 2008   (EP) .................................. 08005226

(51) Int. Cl.
*F04B 39/04* (2006.01)
*F04B 39/06* (2006.01)

(52) U.S. Cl. .................... 417/228; 417/414; 417/368
(58) Field of Classification Search ............ 417/228, 417/414, 368, 53
See application file for complete search history.

(56) References Cited

U.S. PATENT DOCUMENTS

| | | | | |
|---|---|---|---|---|
| 6,059,539 A | * | 5/2000 | Nyilas et al. | 417/228 |
| 7,156,627 B2 | * | 1/2007 | Lenderink et al. | 417/423.8 |
| 7,424,917 B2 | * | 9/2008 | Martin | 166/335 |

FOREIGN PATENT DOCUMENTS

| | | |
|---|---|---|
| WO | WO 2005068847 A1 | 7/2005 |
| WO | WO 2007110271 A1 | 10/2007 |
| WO | WO 2007110281 A1 | 10/2007 |
| WO | WO 2007110368 A1 | 10/2007 |

* cited by examiner

*Primary Examiner* — Charles Freay
*Assistant Examiner* — Patrick Hamo

(57) ABSTRACT

A compressor unit is provided. The compressor unit includes a compressor and a motor enclosed by a common casing in a sealless manner. A stator of the motor is cooled by a cooling system. A partition separates a process fluid from a cooling fluid in an area of the stator. Further, a relation between a process fluid pressure and a cooling fluid pressure is established by using a pressure compensator.

16 Claims, 7 Drawing Sheets

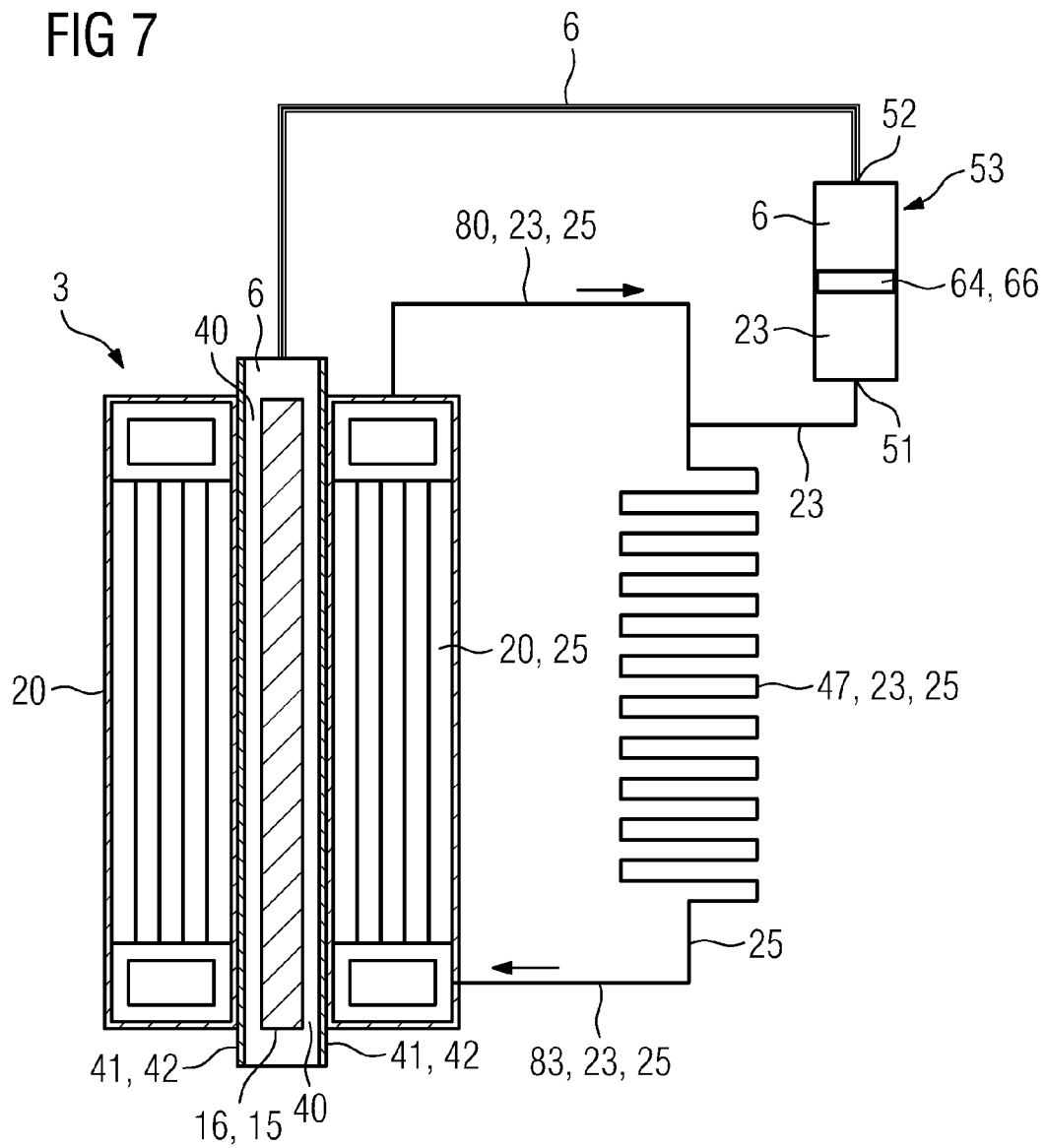

COMPRESSOR UNIT WITH PRESSURE COMPENSATOR

CROSS REFERENCE TO RELATED APPLICATIONS

This application is the US National Stage of International Application No. PCT/EP2009/051960 filed Feb. 19, 2009, and claims the benefit thereof. The International Application claims the benefits of European Application No. 08005226.9 EP filed Mar. 19, 2008. All of the applications are incorporated by reference herein in their entirety.

FIELD OF INVENTION

The invention relates to a compressor unit for compressing a process fluid, comprising a compressor with an inlet, at least one compression stage and an outlet, a motor, with a stator and a rotor, a cooling system to cool the motor, wherein the cooling system contains a cooling fluid.

BACKGROUND OF INVENTION

Compressor units of the above mentioned type are used in a variety of applications in wide ranges of sizes. Of special interest is the application of an electrically driven compressor in combination with a gas tight or hermetically closed casing enclosing the motor and the compressor, so that the necessity for the use of a rotor sealing is avoided. Since a rotor sealing is always complicated and expensive especially due to the normally connected auxiliary system, which is usually needed to provide a sealing fluid, the sealless application is of an enormous interest. Further reasons for the effort to obtain a sealless machine are new fields of application for compressor units. In general the new applications concentrate on the avoidance of media exchange between a process fluid to be compressed and the surrounding. One possible usage is the compression of toxic fluids, for which the auxiliary system to provide a sealing fluid for shaft sealing is extremely complicated. Another even more interesting application is the compression of gas, in particular natural gas, below sea level respectively with surrounding sea water. The economic interest in these compressor units is increasingly high due to the shortage of fossil fuels and the new possibility to exploit natural gas resources in the ocean more efficiently.

However, the new development of compressing natural gas below sea level directly at the well head goes along with enormous technical problems connected with difficult operating conditions and bad accessibility of the compressor units. Major challenges are low temperatures near the freezing point, high pressure of the surrounding chemically aggressive sea water, non purified and chemically aggressive fluids to be compressed, wherein the natural gas varies in the suction pressure and carries next to foreign particles also non gaseous fluids respectively liquids in significant amounts.

Further, over the life time of the well, the pressure of the natural gas to be exploited decreases significantly and due to environmental protection no media exchange between the compressor unit and the surrounding is admitted.

SUMMARY OF INVENTION

The compressor and the motor can be arranged without a shaft sealing in one casing, when a partition wall is provided between the stator of the motor and the rotor, which partition wall separates the inner part of the stator from the process fluid. Such a partition wall, which is preferably cylindrically shaped, has to fulfill several requirements, which are difficult to combine. The stator of the electrical motor needs a cooling system to discharge heat generated in the stator. Especially due to the varying process fluid pressure the partition has to cope with high differential pressures between the process fluid, which is located in the gap between the rotor and the stator, and the cooling fluid inside the stator. Next to these eddy currents in the partition must be avoided and therefore the partition material should be not electrically conductive. Further the partition cannot be built very thick to maintain the efficiency of the motor and it has to endure the chemically aggressive process fluid over a long period of time without replacement. A material for fulfilling all these requirements is nearly not available or very expensive and therefore it is one object of the invention to decrease the mechanical load on the partition.

The object is achieved by a compressor unit of the above mentioned type, which cooling system is connected to a first terminal of a pressure compensator in a pressure transmitting way. A second terminal of the pressure compensator is connected to a point in the flow path of the process fluid flowing from an inlet line through the compressor stages and through an outlet line, wherein the pressure compensator establishes a certain relation between the fluid pressure in the cooling system and the process fluid pressure in the flow path.

The cooling system can be operated in an open loop, wherein cooling fluid is exchanged permanently but it is preferred that the cooling fluid circulates in a closed loop at least in a primary loop, which removes the heat directly from the stator of the motor. The cooling fluid can be either a gas or liquid or can be operated phase changing. The pressure compensator is preferably used to nearly equalize the pressure between the process fluid and the cooling fluid but can also be built to establish a certain pressure difference between these fluids or to establish a special proportion between the pressures or to combine these effects.

One major advantage gained by the invention is the decrease of mechanical load on the partition, which then can be built with a closer focus on efficiency of operation. The compensator advantageously decreases the pressure difference over the partition and eventually to combine this with a special direction of pressure difference maintained over all possible operating conditions.

One embodiment of the invention provides the pressure compensator comprising a cell, which is partly filled with process fluid and partly filled with cooling fluid and wherein a movable separation element is provided between the fluids, which allows the establishment of a mechanical equilibrium state between the pressures of the fluids but prevents mixing of the fluids. Such a design of the compensator is a simple way to put the invention into practice. The separation element can be a piston of for instance cylindrical shape moving in a corresponding cylindrical shaped cell of the compensator. If the piston is moveable in vertical direction, gravity can be used to establish a defined pressure difference between the two separated fluids. Further the pressure difference can be established by exposing different surface areas of the piston to the respective fluids. Another way to provide a pressure difference using the compensator is the provision of an elastic element, for instance a spring, spring loading a piston into one direction. These designs can be applied separately or can be combined with each other in any way.

Another possibility to separate the two fluids and prevent mixing is to provide a membrane as the separation element.

Preferably a pressure difference between the two fluids is established in such a manner that the cooling fluid is at a higher pressure level than the process fluid in the area of the partition. Assuming even little leakages this way the cooling fluid is not contaminated by the process fluid and therefore the cooling of the stator is not endangered. Further the cooling fluid can be chosen of a higher viscosity so that it cannot enter small holes or pores of the partition.

Another possibility to maintain a certain pressure difference is to provide a pump in the loop of the cooling fluid, which increases the pressure in particular in the area of the partition. Therefore a preferred installation point of the pump is upstream the partition, respectively the stator. Since the cooling fluid flows preferably in a closed primary loop, any location in the closed loop between the connection the connection to the first terminal of the compensator and the stator is preferred. That way the pressure loss over channels for the cooling fluid through the stator adds up to the pressure difference between the process fluid and the cooling fluid. The usage of a pump has the further advantage that always a flow of the cooling fluid is guaranteed.

Another embodiment of the invention provides a compressor, which comprises at least two compression stages in serial order connected by a crossover connection between the first stage and the second stage of the compressor, wherein the first terminal of the compensator is connected to the cross over connection. This arrangement enables a higher pressure level of the cooling fluid than the process fluid at the inlet. This extraction can advantageously also be used to cool modules of the compressor unit using process fluid and establishing a flow from the extraction through the modules to be cooled to the inlet of the process fluid into the compressor. Is the extraction pressure high enough with respect to the inlet pressure a good cooling effect will be obtained due to the differential pressure between the extraction and the inlet pressure of the process fluid.

A further preferred embodiment provides a mutual gas tight casing for the motor and the compressor of the compressor unit. As mentioned before, such an embodiment enables a sealless arrangement.

Preferably the compressor and the rotor are supported by a common shaft, which is supported by magnetic bearings. The common shaft can be assembled of several parts, which might be supported by individual sets of bearings and the parts can be connected by a quill shaft. One benefit of the usage of magnetic bearings is the avoidance of any lubricant and the possibility to cool the bearings using the process fluid.

As mentioned before a circumference gap between the rotor and the stator of the motor extending in an axial direction of the shaft is preferably provided, through which the process fluid flows also for cooling purpose. One major advantage of this design is again the avoidance of a shaft sealing against the process fluid.

Preferably the second terminal of the compensator is connected to the flow path such that the cooling fluid has a higher pressure than the process fluid in the area of the partition. This connection should correspond to the connection of the first terminal to the cooling system so that both connections are using pressure losses according to the flow of both fluids to obtain the desired pressure difference.

A preferred embodiment of the invention provides a heat exchanger for cooling the cooling fluid in the cooling system. The heat exchanger exchanges heat between the primary cooling fluid flowing in the cooling system and a secondary cooling fluid, which can be of any adequate type, for instance air or for example sea water.

Especially for underwater operation, where maintenance opportunities are rare, one preferred design of the cooling system uses natural convection as the impelling force for the cooling fluids circulation. The natural convection can in particular be advantageously used for the primary cooling loop respectively primary cooling fluid. The cooling system can be designed in such a way that the cooling fluid is circulating by the principle of a thermosiphon. In general the thermosiphon is a method of passive heat exchange based on natural convection which circulates liquid in a vertical closed-loop circuit without requiring a conventional pump. Its intended purpose is to simplify the pumping of liquid and/or heat transfer, by avoiding the cost and complexity of a conventional liquid pump.

BRIEF DESCRIPTION OF THE DRAWINGS

The above mentioned attributes and other features and advantages of the invention and the manner of attaining them will become more apparent and the invention itself will be better understood by reference to the following description of the currently best mode of carrying out the invention taken in conjunction with the accompanying drawings.

DETAILED DESCRIPTION OF INVENTION

Figure 1:
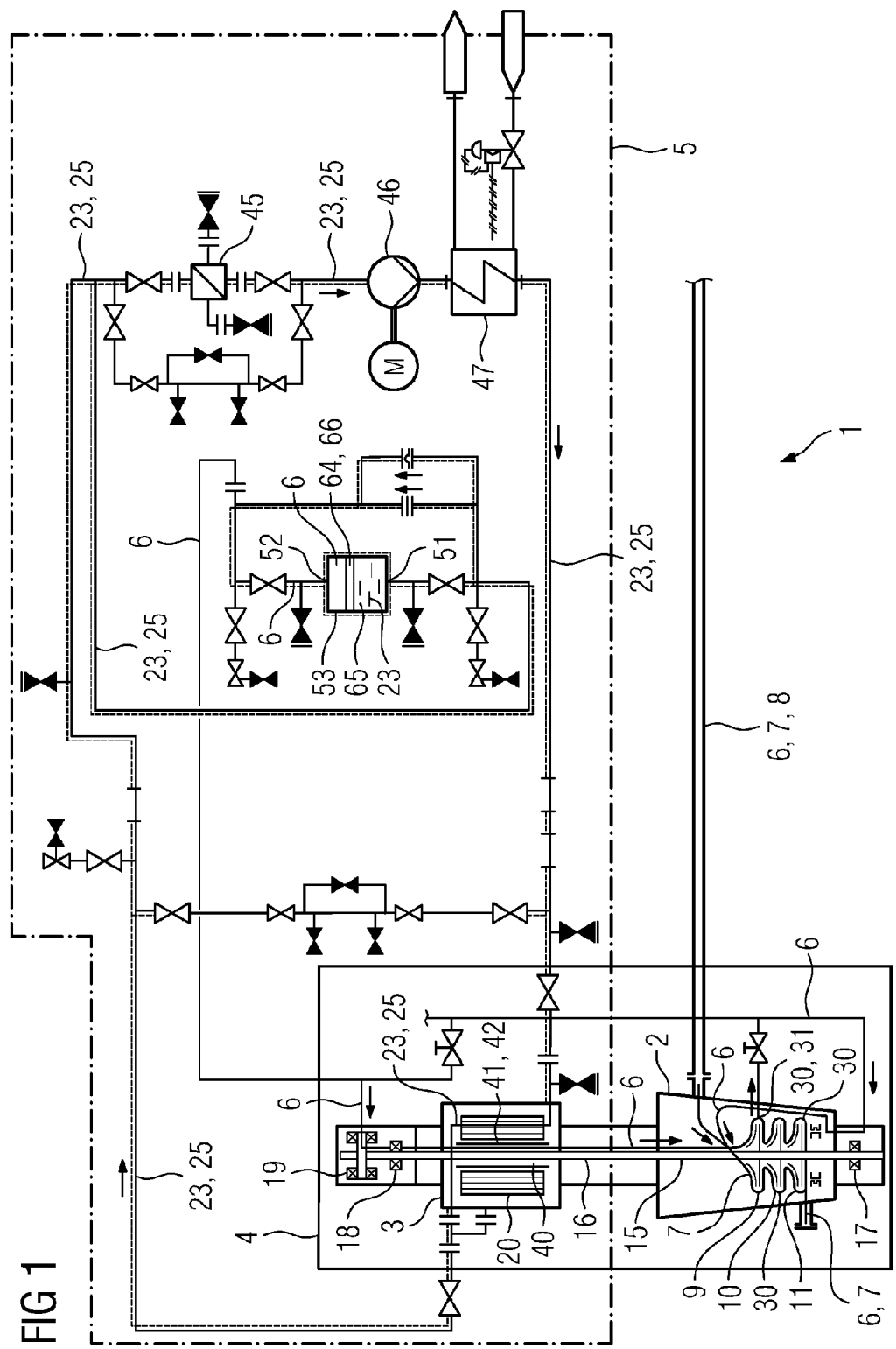
FIG. 1 shows a schematic flow diagram of a compressor unit comprising a cooling system and a pressure compensator, FIG. 2-7 respectively show different schematic depictions of the compressor unit with varying arrangements of a fluid loop of the cooling system, the motor with the stator and the rotor and the gap between both, through which process fluid is flowing, the compensator according to the invention, a heat exchanger, an extraction of process fluid and a pump when appropriate.

FIG. 1 shows a schematic overview of a flow diagram of a compressor unit 1 according to the invention. Comprising a compressor 2, a motor 3, both mutually enclosed by a gas tight casing 4 and a cooling system 5.

The compressor unit 1 compresses a process fluid 6, which flows along a flow path 7 from an in-let-line 8 through three compression stages 9, 10, 11 of the compressor 2 into an outlet line 12. Preferably the process fluid 6 is natural gas and the compressor unit 1 located in a non depicted manner above a well head on the ocean ground below sea level.

The compressor 2 shares a common shaft 15 with a rotor 16 of the motor 3, which shaft is supported by two radial magnetic bearings 17, 18 and one axial magnetic bearing 19. The motor 3 comprises next to the rotor 16 a stator 20, which generates a rotating magnetic field to drive the rotor 16. The generation of the magnetic field produces a significant power loss, which is generating heat, which head must be led away to avoid thermal destruction. The heat flux from the stator 20 is established by the cooling system 5, in which a cooling fluid 23 circulates in a loop 25.

The magnetic bearings 17, 18, 19 are cooled by process fluid 6, tapped of from a crossover connection 30 between the first stage 9 and the second stage 10 of the compressor 2. The process fluid 6 from this extraction 31 flows through cooling channels, which are not further shown, of the bearings 17, 18, 19 back to the inlet line 8 in the internal of the compressor 2.

Between the stator 20 and the rotor 16 of the motor 3 a gap 40 is provided, through which the process fluid 6 from the extraction 31 flows back to the inlet line 8. The stator 20 surrounds the rotor 16 in a cylindrical manner adjoining to the gap with a partition 41 respectively a partition wall 42. This partition 41 is also sometimes called 'can' or 'partition pipe'. The partition 41 has to cope with the differential pressure between the process fluid 6 in the area of the partition 41 and the cooling fluid 23 in the stator 20. To avoid high eddy current losses and to establish a good efficiency of the motor 3 the partition 41 must be thin walled and electrically non conductive. Further the partition 41 must be of a chemically inert material to endure the chemical aggressiveness of the process fluid 6.

In flow direction of the cooling fluid 33 the loop 35 of the cooling system 5 basically passes the following modules in this order: stator 20, filter 45, pump 46, and heat exchanger 47. Further between the stator 20 and the filter 45 a first terminal 51 of a pressure compensator 53 is connected to the loop 25. A second terminal 52 of the pressure compensator 53 is connected to the extraction 31.

The pressure compensator 53 comprises a cell 65 and is partially filled with process fluid 6 and cooling fluid 23, wherein theses two fluids are separated from each other to prevent mixing by a movable separation element 64 of the cylindrical shape, which can move in a longitudinal direction of a cylindrical shaped cell 65. The separation element 64 is built as a piston 66 but could also be a membrane. The movable piston 66 enables a mechanical equilibrium between the pressure of the process fluid 6 and of the cooling fluid 23. In the area of the piston 66 respectively the compensator 53 the cooling fluid 23 has a slightly higher pressure than the process fluid 6 due to the gravity of the piston, if the longitudinal axis of the cell 65 is aligned vertically. Further the pump 46 increases the pressure of the cooling fluid 23 before it enters the heat exchanger 47 and subsequently the stator 20 so that in the stator 20 the cooling fluid 23 has a higher pressure than the process fluid 6 flowing through the gap 40. Therefore in the case of any leakage in the area of the stator, process fluids 6 cannot enter the stator 20.

Preferably the shaft 15 of the compressor unit 1 is aligned vertically to minimize the load on the radial bearings 17, 18 and the thrust resulting from the pressure difference over the compressor 2 is at least partially compensated during nominal operation by the gravity of the shaft 15 respectively the gravity of the complete rotor of the compressor unit 1.

Figure 2:
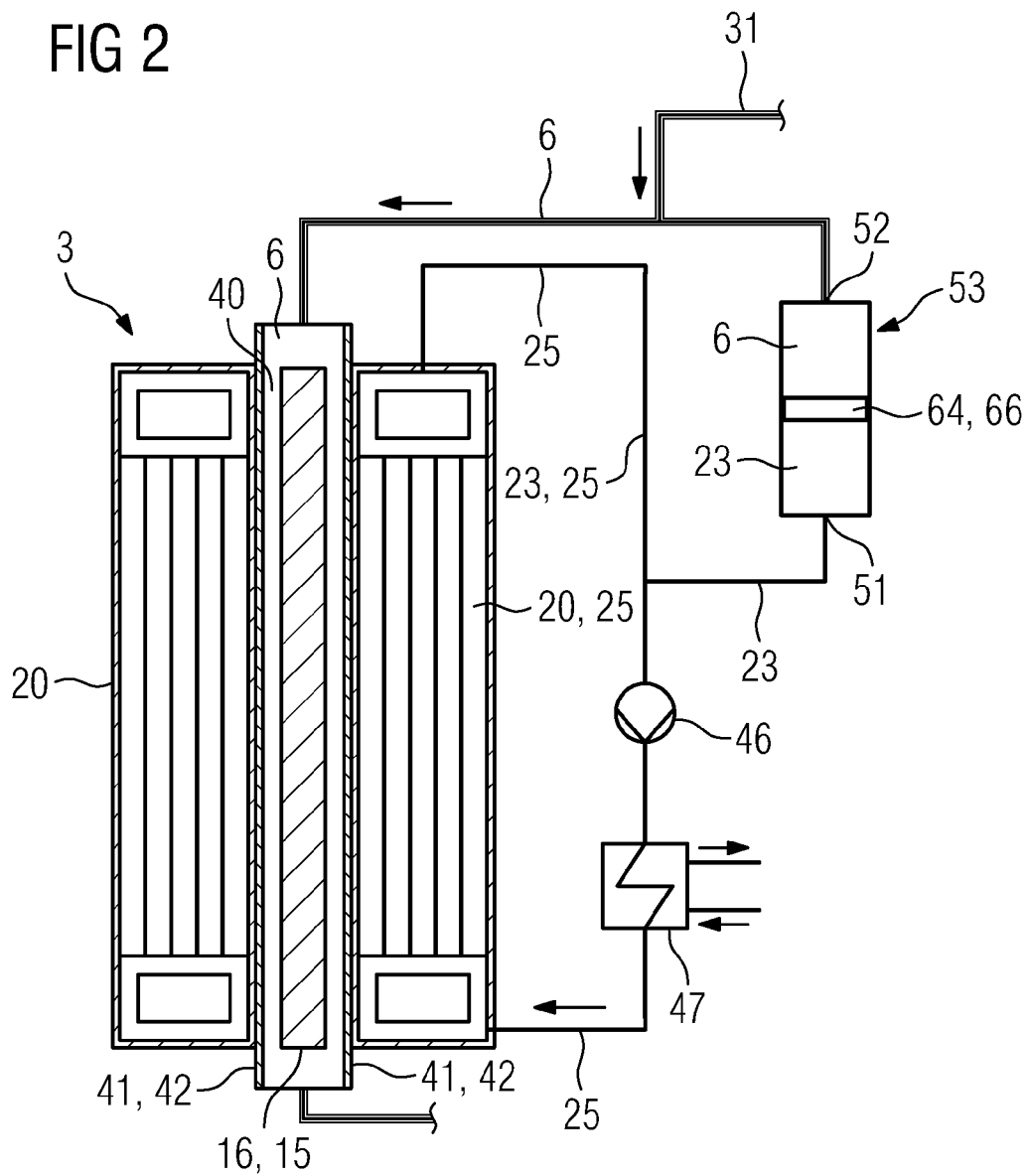

FIG. 2 shows the principle of the compressor unit 1 of FIG. 1 in a simplified depiction. Especially the partition 41 and the flow through the gap 40 is shown in more detail. The heat exchanger 47 is operated with a liquid 17, which can be water. The compensator 53 is connected with its first terminal 51 to the loop 25 between the stator 20 and the pump 46.

Figure 3:
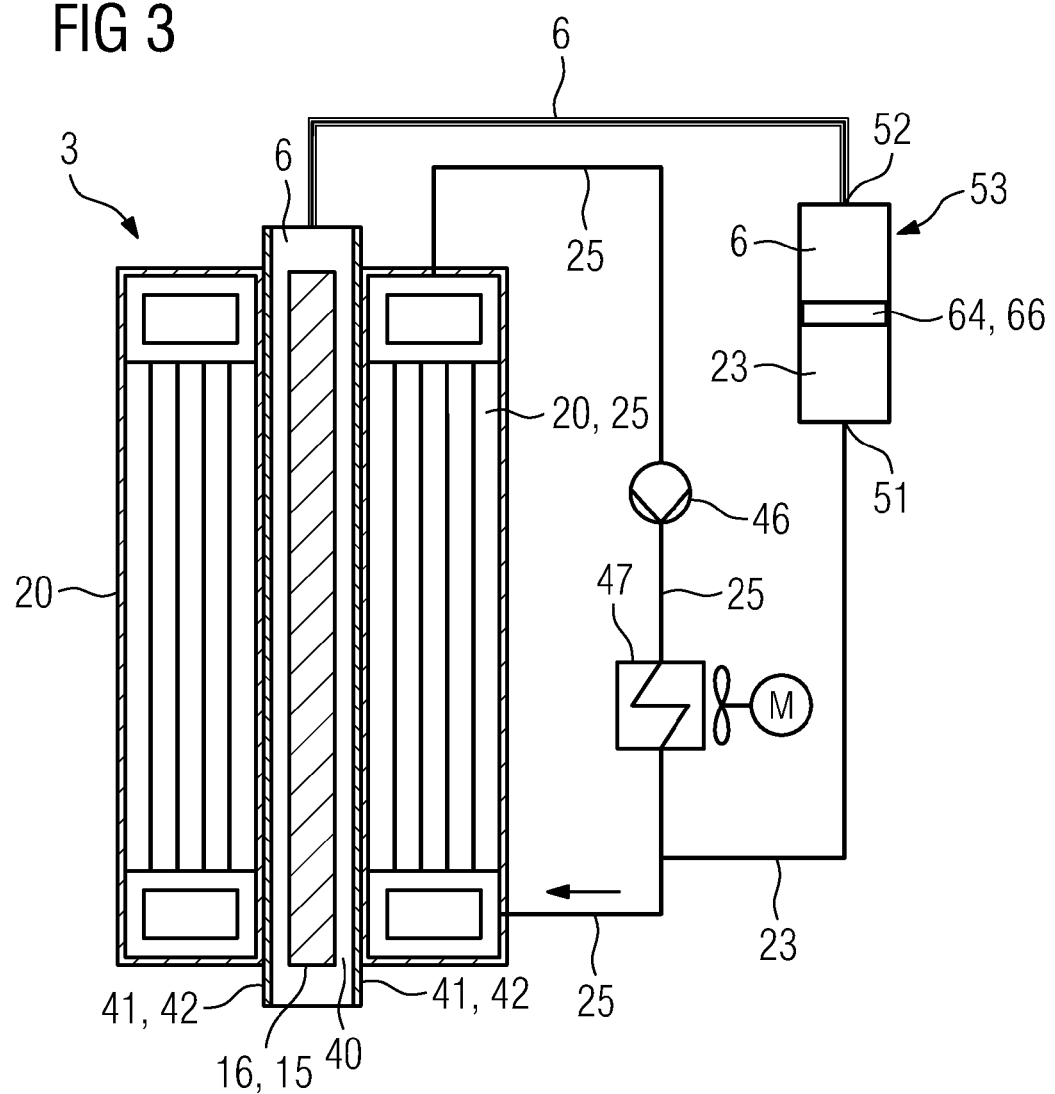

FIG. 3 shows the compressor unit 1 with an air cooled heat exchanger 47, wherein the compensator 53 is connected with its first terminal 51 to the loop 25 between the heat exchanger 47 and the stator 20. This way a nearly equal pressure is established between the process fluid 6 and the cooling fluid 23 in the area of the partition 41 respectively the gap 40.

Figure 4:
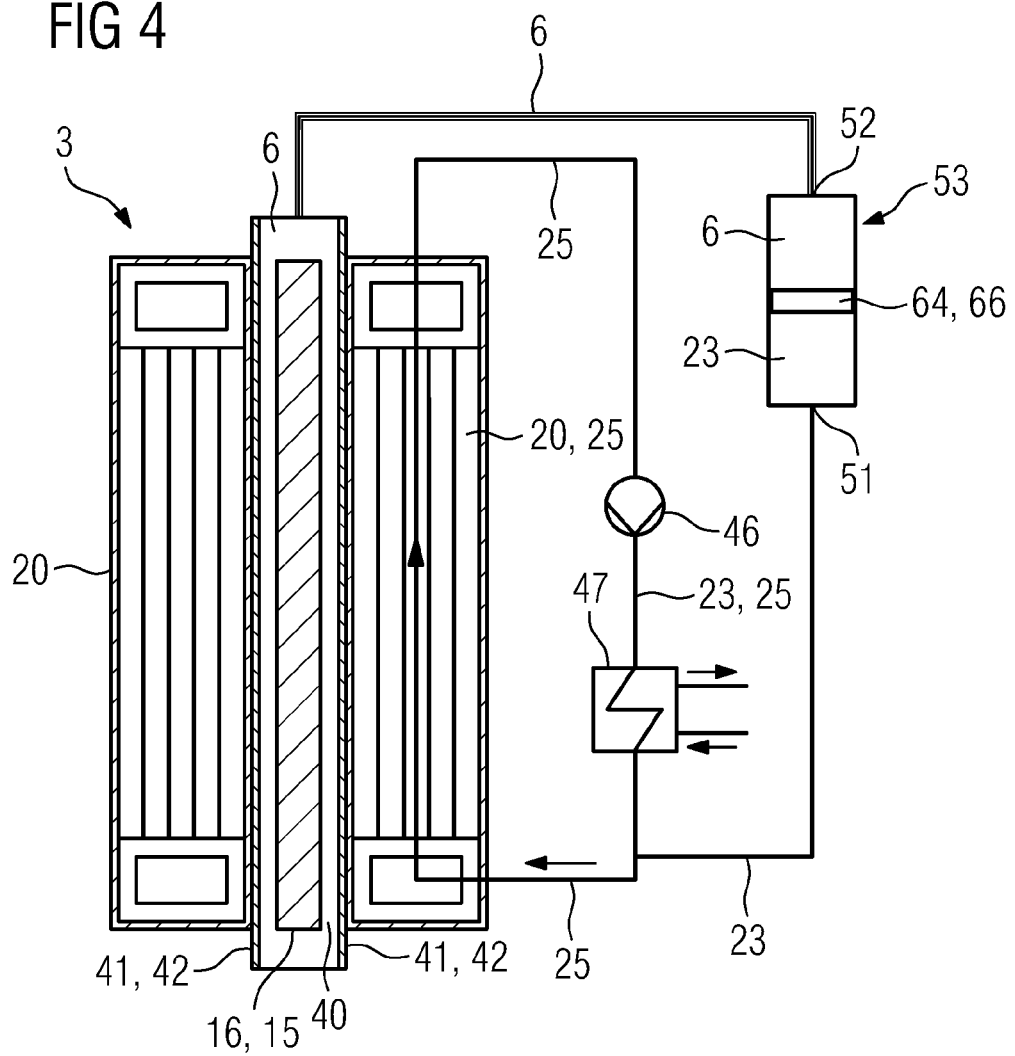

The simplified principle of FIG. 4 shows basically the arrangement of FIG. 3 but with a liquid cooled heat exchanger 47.

Figure 5:
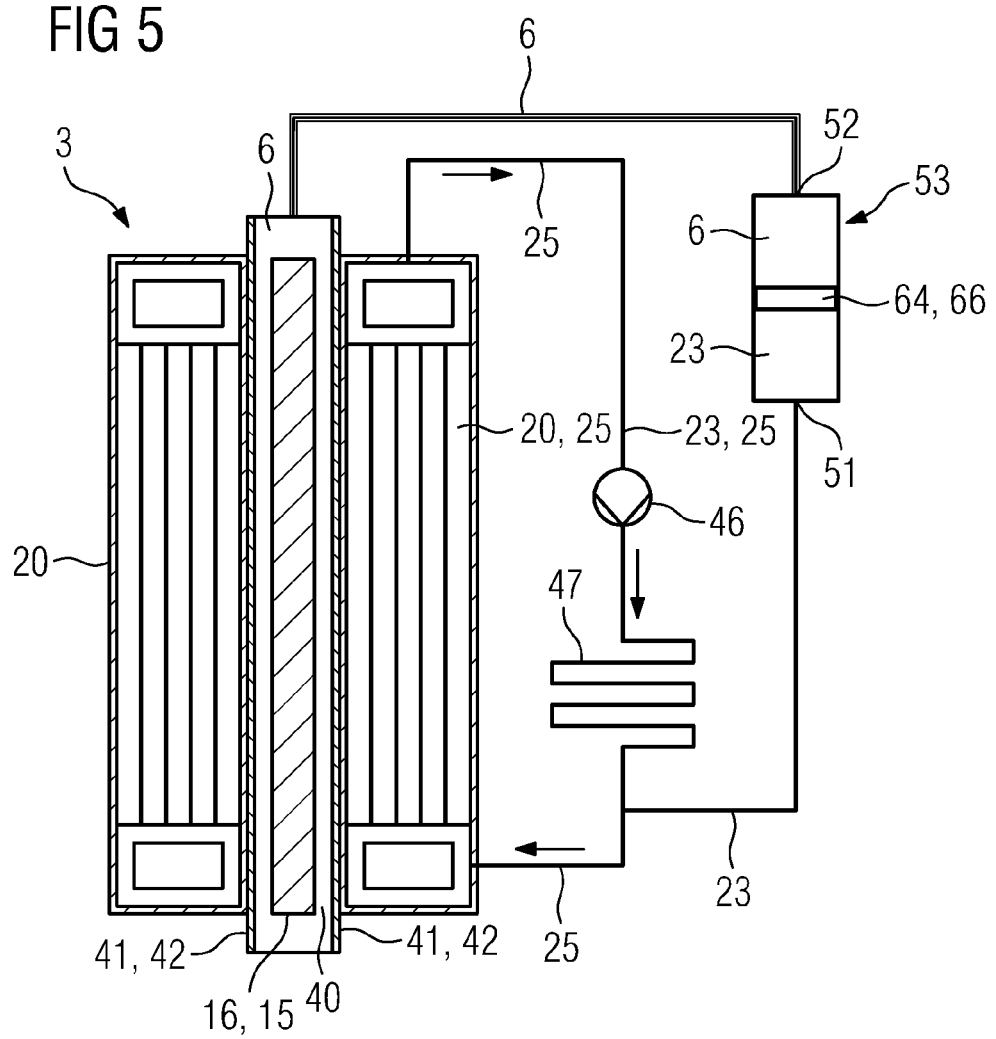

The simplified flow diagram of FIG. 5 shows the heat exchanger 47 to be operated respectively cooled with sea water preferably for sub sea operation.

Figure 6:
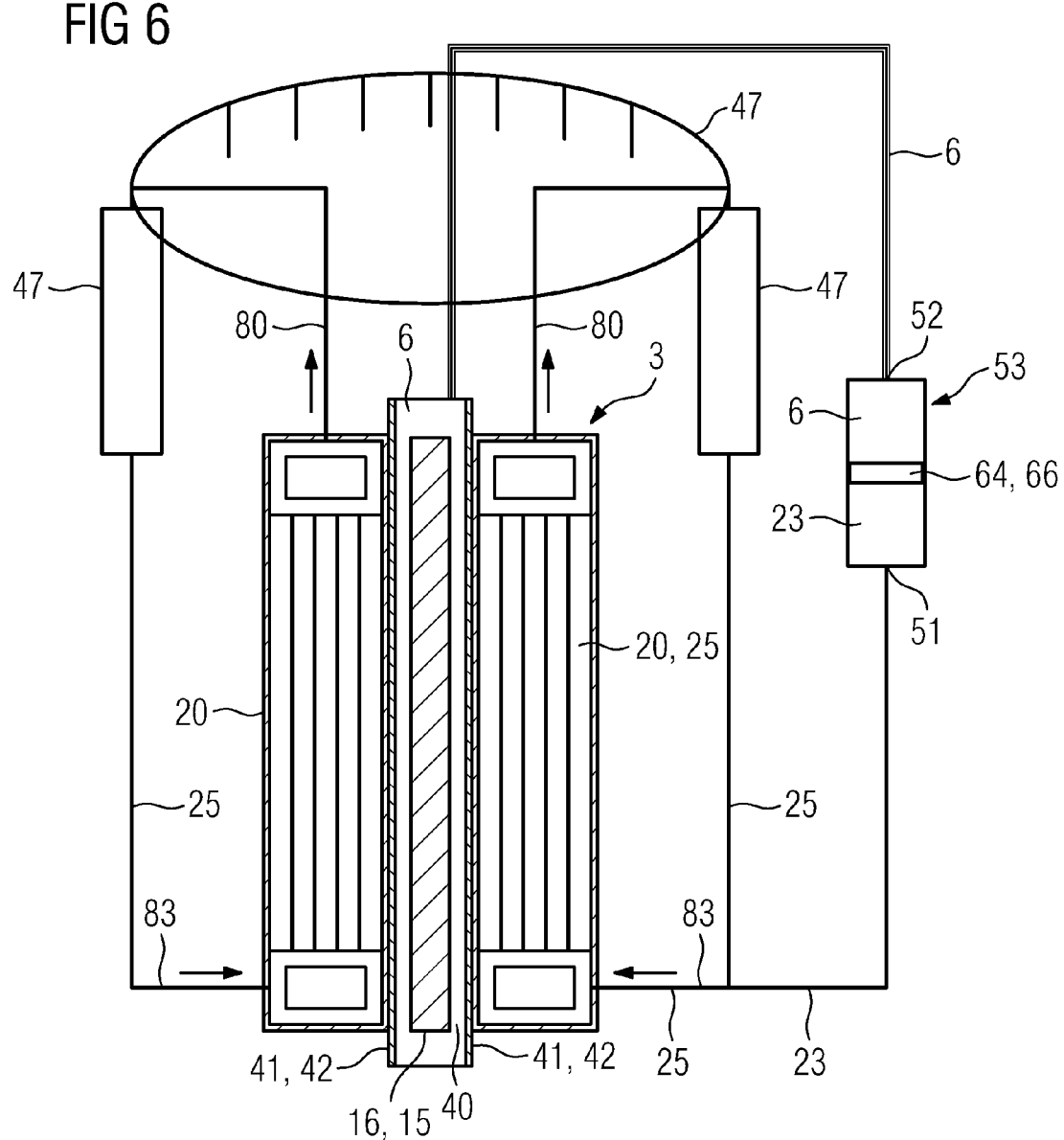

FIG. 6 and FIG. 7 show the compressor unit 1 in a simplified manner without any pump 46 in the loop 25, wherein the cooling fluid 23 circulates only by natural convection.

FIG. 7 shows the special case of a thermosiphon principle, wherein the cooling fluid 23 enters the heat exchangers 47 as a gas 80 and leaves it as a liquid 83.

The invention claimed is:

1. A compressor unit for compressing a process fluid, comprising:
a compressor with an inlet, a compressing stage, and an outlet;
a motor with a stator and a rotor;
a cooling system with a cooling fluid for cooling the motor; and
a pressure compensator,
wherein the cooling system is connected to a first terminal of the pressure compensator in a pressure transmitting way,
wherein a second terminal of the pressure compensator is connected to a point in a flow path of the process fluid flowing from the inlet through the compression stage and through the outlet, and
wherein the pressure compensator establishes a relation between a fluid pressure of the cooling fluid in the cooling system and a process fluid pressure of the process fluid in the flow path of the compressor,
wherein the compressor comprises two compression stages connected in series via a crossover connection, and
wherein the second terminal of the pressure compensator is connected to the crossover connection between a first stage and a second stage of the compressor.

2. The compressor unit according to claim 1, wherein the pressure compensator comprises a cell which is partly filled with the process fluid and partly filled with the cooling fluid.

3. The compressor unit according to claim 2, wherein a moveable separation element, which is provided between the cooling fluid and the process fluid, allows establishment of an mechanical equilibrium state between the pressures of the fluids and prevents mixing the fluids.

4. The compressor unit according to claim 3, wherein the separation element is a piston.

5. The compressor unit according to claim 3, wherein the separation element is a membrane.

6. The compressor unit according to claim 1, wherein the motor and the compressor are mutually enclosed by a gas tight casing.

7. The compressor unit according to claim 1, wherein the compressor and the rotor of the motor are supported by a common shaft, the common shaft being supported by magnetic bearings.

8. The compressor unit according to claim 7, wherein the magnetic bearings are cooled by the process fluid.

9. The compressor unit according to claim 1, wherein a gap between the stator and the rotor of the motor is filled with the process fluid and a partition separates the process fluid from the cooling fluid of the cooling system.

10. The compressor unit according to claim 9, wherein the second terminal of the compensator is connected to the flow path such that the cooling fluid has a higher pressure than the process fluid in the area of the partition.

11. The compressor unit according to claim 9, wherein the cooling system includes a pump increasing the pressure of the cooling fluid in the stator in order to maintain a higher pressure of the cooling fluid in relation to the process fluid in the area of the partition.

12. The compressor unit according to claim 11, wherein the cooling system comprises a heat exchanger for cooling the cooling fluid.

13. The compressor unit according to claim 1, wherein a circulation of the cooling fluid is impelled by natural convection.

14. The compressor unit according to claim 13, wherein the cooling fluid circulates by principal of a thermal siphon.

15. The compressor unit according to claim 12, wherein the heat exchanger is located downstream of the pump.

16. The compressor unit according to claim 11, wherein the pump is located downstream of the connection to the first terminal.

* * * * *